(12) United States Patent (10) Patent No.: US 8,784,566 B2
Zhang (45) Date of Patent: Jul. 22, 2014

(54) CELLULOSE-SOLVENT-BASED LIGNOCELLULOSE FRACTIONATION WITH MODEST REACTION CONDITIONS AND REAGENT CYCLING

(75) Inventor: Y. H. Percival Zhang, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 12/294,923

(22) PCT Filed: Mar. 29, 2006

(86) PCT No.: PCT/US2006/011411
§ 371 (c)(1),
(2), (4) Date: Nov. 10, 2008

(87) PCT Pub. No.: WO2007/111605
PCT Pub. Date: Oct. 4, 2007

(65) Prior Publication Data
US 2010/0170504 A1  Jul. 8, 2010

(51) Int. Cl.
*C13K 1/02* (2006.01)
*C08B 30/00* (2006.01)
*C08B 37/00* (2006.01)

(52) U.S. Cl.
USPC .................................. 127/37; 127/34; 127/36

(58) Field of Classification Search
None
See application file for complete search history.

(56) References Cited

U.S. PATENT DOCUMENTS 2,106,797 A * 2/1938 Dreyfus ........................... 162/14
3,402,997 A * 9/1968 Mustian, Jr. ............... 423/321.1
4,058,411 A * 11/1977 Bellamy et al. ................. 127/37
4,174,976 A   11/1979 Tsao et al.
4,265,675 A    5/1981 Tsao et al.
4,281,063 A *  7/1981 Tsao et al. ....................... 435/99
4,677,198 A    6/1987 Linnett et al.
5,628,941 A    5/1997 Kalt et al.
6,228,177 B1   5/2001 Torget (Continued)

FOREIGN PATENT DOCUMENTS

CN    1588085 A   3/2005
EP    0147634 B2  6/1996

(Continued)

OTHER PUBLICATIONS

Boerstoel et al(Liquid crystalline solutions of cellulose in phosphoric acid, Polymer, 42, (2001) 7371-7379).*

(Continued)

*Primary Examiner* — Melvin C Mayes
*Assistant Examiner* — Michael Forrest
(74) *Attorney, Agent, or Firm* — New River Valley IP Law, PC; Michele L. Mayberry

(57) ABSTRACT

Embodiments of the present invention overcome the well-known recalcitrance of lignocellulosic biomass in an economically viable manner. A process and system are provided for the efficient fractionation of lignocellulosic biomass into cellulose, hemicellulose sugars, lignin, and acetic acid. The cellulose thus obtained is highly amorphous and can be readily converted into glucose using known methods. Fermentable hemicellulose sugars, low-molecular-weight lignin, and purified acetic acid are also major products of the process and system. The modest process conditions and low solvent/solid ratios of some embodiments of the invention imply relatively low capital and processing costs.

13 Claims, 2 Drawing Sheets

(56) References Cited

U.S. PATENT DOCUMENTS

| | | | |
|---|---|---|---|
| 6,258,175 | B1 | 7/2001 | Lightner |
| 7,932,065 | B2 | 4/2011 | Medoff |
| 2008/0295981 | A1 | 12/2008 | Shin et al. |
| 2009/0229599 | A1 | 9/2009 | Zhang |
| 2013/0236953 | A1 | 9/2013 | Zhang |

FOREIGN PATENT DOCUMENTS

| | | | |
|---|---|---|---|
| FR | 2264489 | A1 | 10/1975 |
| GB | 2017707 | A | 10/1979 |
| JP | 57022695 | A | 2/1982 |
| JP | 2006149343 | | 6/2006 |
| JP | 2006149343 | A | 6/2006 |
| JP | 5209597 | B2 | 6/2013 |
| RU | 2189996 | C2 | 9/2002 |
| RU | 2463402 | C2 | 10/2012 |
| WO | 9523827 | A | 9/1995 |
| WO | 2007019505 | A | 2/2007 |
| WO | 2007095787 | A | 8/2007 |
| WO | 2007111605 | A | 10/2007 |
| WO | 2009114843 | A1 | 9/2009 |

OTHER PUBLICATIONS

Co-Pending application CN200680054729.0, office action 3 and translation.
Co-Pending application CN200680054729.0, response to office action 3 and claims translation.
Co-pending Application JP 2009-502734, Response to Aug. 23, 2011Office Action, with Claims Translation.
Co-Pending application CN200980117175.8, office action 1 translation, dated Sep. 4, 2012.
Co-Pending application CN200980117175.8, office action 1, dated Sep. 4, 2012.
Co-Pending application CN200980117175.8, Response to Notification for Divisional dated Jul. 9, 2012 (no translation available).
Co-Pending application CN200980117175.8, Response to office action 1, claims, and translation, dated Jan. 21, 2013.
Co-pending Application JP 2009-502734, Decision of Grant, Jan. 15, 2013 (translation not available).
Co-pending Application JP 2009-502734, Response to Office Action 2 in Japanese, with Claims Translation dated Jun. 4, 2012.
Co-Pending Application, AU006340913, Australian Official Notice of Acceptance dated Sep. 7, 2012.
Co-Pending Application, AU2009223302, Australian Examination Report dated Dec. 13, 2012.
Co-Pending Application, CA 2,647,516, Examiner's Report dated Dec. 6, 2012.
Co-Pending application India 2274/MUMNP/2008, Second Response to First Examination Report, dated Feb. 22, 2013.
Co-pending Application JP 2009-502734, Decision of Grant (Translation), Jan. 22, 2013.
Co-Pending application CN200680054729.0, office action 1 and translation.
Co-Pending application CN200680054729.0, office action 2 and translation.
Co-Pending application CN200680054729.0, response to office action 1 and claims translation.
Co-Pending application CN200680054729.0, response to office action 2 and claims translation and declaration translation.
Co-pending application, PCT/US09/37234 (published as W02009/114843).
Co-Pending Application, U.S. Appl. No. 12/404,466, filed Mar. 16, 2009.
Co-pending EU application 06748858, issued as EP2007945, file history.
International Preliminary Report on Patentability dated Sep. 14, 2010 from co-pending Application PCT/US09/37234 (W02009/114843), 5pgs.
International Search Report dated Sep. 17, 2009 from co-pending Application PCT/US09/37234 (W02009/114843), 4 pgs.
International Written Opinion dated Sep. 14, 2010 from co-pending Application PCT/US09/37234 (W02009/114843), 4 pgs.
Co-Pending application CN200680054729.0, office action 4 translation, dated Jun. 29, 2012.
Co-Pending application CN200680054729.0, office action 4, dated Jun. 29, 2012.
Co-Pending application CN200680054729.0, response to office action 1 (translation) dated Feb. 23, 2011.
Co-Pending application CN200680054729.0, response to office action 2 (translation) dated Jun. 24, 2011.
Co-Pending application CN200680054729.0, response to office action 3 (translation), dated Sep. 13, 2011.
Co-Pending application CN200680054729.0, response to office action 4 (and translation), dated Sep. 14, 2012.
Co-Pending application CN200980117175.8, Notification to Make Divisional, dated Apr. 16, 2012, with translation, 3pgs.
Co-Pending application India 2274/MUMNP/2008, First Examination Report, dated Feb. 22, 2012, 3 pgs.
Co-Pending application India 2274/MUMNP/2008, Response to First Examination Report, dated Aug. 21, 2012.
Co-Pending application JP 2009-502734, response to office action 1 (translation), dated Nov. 17, 2011.
Co-Pending application JP 2009-502734, response to office action 2 (translation) dated Jun. 4, 2012.
Co-Pending Application, AU006340913, Australian Examination Report dated Jul. 4, 2012.
Co-Pending Application, AU006340913, Response to Office Action 2, dated Sep. 6, 2012.
Co-Pending Application, AU006340913, Response to Office Action, Jun. 27, 2012.
Co-Pending application CN200680054729.0, office action 1 and translation, dated Oct. 9, 2010.
Co-Pending application CN200680054729.0, office action 2 and translation, dated Apr. 11, 2011.
Co-Pending application CN200680054729.0, response to office action 1 and claims translation, dated Feb. 23, 2011.
Co-Pending application CN200680054729.0, response to office action 2 with declaration and claims translation, dated Jun. 24, 2011.
Co-pending Application JP 2009-502734, Dec. 6, 2011 Office Action and Translation.
Co-Pending application CN200980117175.8, office action 2 translation, dated Feb. 21, 2013.
Co-Pending application CN200980117175.8, office action 2, dated Feb. 21, 2013.
Co-Pending application RU2010141585, English Translation of Office Action of Feb. 1, 2013.
Co-Pending application RU2010141585, Office Action of Feb. 1, 2013.
N.S. Zefirov, Himicheskaja Encyklopedija [Chemical Encyclopaedia], vol. 5, Gol'shaja Sovetskaja Encyklopedija, Moscow, 1998.
Australian Examination Report dated Dec. 9, 2010 from co-pending Australian Application No. 06748858.5.
Co-Pending application CN200680054729.0, office action 1 and translation, dated 2010.
Co-Pending application CN200680054729.0, office action 2 and translation. Dated: 2011.
Co-Pending application CN200680054729.0, response to office action 1 and claims translation. Dated: 2010.
Co-Pending application CN200680054729.0, response to office action 2 and claims translation and declaration translation. Dated: 2011.
Co-pending application, PCT/US09/37234 (published as WO2009/114843). Dated: 2009.
Co-Pending Application, U.S. Appl. No. 12/404,466 filed Mar. 16, 2009.
Co-pending EU application 06748858, issued as EP2007945, file history. Dated: 2010.
European Examination Report dated Feb. 10, 2010 for co-pending European Application No. 06748858.5.

(56) References Cited

OTHER PUBLICATIONS

International Preliminary Report on Patentability dated Sep. 14, 2010 from co-pending Application PCT/US09/37234 (WO2009/114843), 5pgs.
International Search Report dated Sep. 17, 2009 from co-pending Application PCT/US09/37234 (WO2009/114843), 4 pgs.
International Written Opinion and Search Report, dated May 25, 2009 from PCT/US2009/37234, 16 pgs.
International Written Opinion dated Sep. 14, 2010 from co-pending Application PCT/US09/37234 (WO2009/114843), 4 pgs.
Co-Pending Application CA 2,647,516, Response to Examiner's Report, dated Jun. 6, 2013.
Co-Pending application CN200980117175.8, (translation) response to office action 2, dated Jul. 8, 2013.
Co-Pending application CN200980117175.8, office action 3 translation, dated Jul. 19, 2013.
Co-Pending application CN200980117175.8, office action 3, dated Jul. 19, 2013.
Co-Pending application CN200980117175.8, response to office action 2, dated Jul. 8, 2013.
Co-Pending Application EU 09720599.1, Extended European Search Report, dated Aug. 29, 2013.
Co-Pending application India 2274/MUMNP/2008, Hearing Notice, dated Aug. 7, 2013.
Co-Pending Application No. RU2010141585, Response to Office Action Translation, dated Aug. 1, 2013.
Co-Pending Application No. RU2010141585, Response to Office Action, dated Aug. 1, 2013.
Co-pending U.S. Appl. No. 13/867,573 filed Apr. 22, 2013.
International Preliminary Report on Patentability from WO2007/111605, dated Sep. 30, 2008.
International Written Opinion from WO2007/111605, dated May 24, 2007.
Co-Pending Application CA 2,647,516, Notice of Allowance, dated Oct. 21, 2013.
Co-Pending application CN200980117175.8, Response to office action 3, dated Sep. 29, 2013.
Co-Pending application CN200980117175.8, Translation of Response to office action 3, dated Sep. 29, 2013.
Co-Pending application India 2274/MUMNP/2008, Response to Hearing Notice, dated Oct. 11, 2013, 17 pages.
Co-Pending Application No. RU2010141585, Decision to Grant dated Aug. 22, 2013 and Translation, 13 pages.
Co-Pending Application, AU2009223302, Notice of Acceptance dated Nov. 21, 2013.
Co-Pending Application, AU2009223302, Response to Australian Examination Report dated Nov. 15, 2013, 19 pages.
Co-Pending application CN200680054729.0, office action 3 and translation, dated 2011.
Co-Pending application CN200680054729.0, response to office action 3 and claims translation, dated 2011.
Co-pending Application JP 2009-502734, Office Action and Translation dated Aug. 23, 2011.
Co-pending Application JP 2009-502734, Response to Aug. 23, 2011 Office Action, with Claims Translation.
Isogai and Atalla, "Dissolution of cellulose in aqueous NaOH solutions", Cellulose 5, 309-319, 1998.
John E. Hanby, Jr., Doctor's Dissertation, "The Bond Structure in the Alkaline-Ferric-Tartrate System", The Institute of Paper Chemistry, Appleton, Wisconsin, 1968.
Laslo Zechmeister, Dissertation, "Zur Kenntnis der Cellulose und des Lignins", ETH Zürich, Switzerland, 1913.
Laslo Zechmeister, Dissertation, "Zur Kenntnis der Cellulose und des Lignins", ETH Zürich, Switzerland, 1913. (Translation).
Sarah Kohler, Dissertation, "Ionische Flüssigkeiten als neue Reaktionsmedien für die Veretherung von Cellulose", Friedrich-Schiller-Universitat Jena, 2010.
Sarah Kohler, Dissertation, "Ionische Flüssigkeiten als neue Reaktionsmedien für die Veretherung von Cellulose", Friedrich-Schiller-Universitat Jena, 2010. (Translation).
Co-pending Application JP 2010-550913, First Office Action dated Oct. 28, 2013.
Co-pending Application JP 2010-550913, Translation of First Office Action dated Oct. 28, 2013.
Co-pending application IN 2274/MUMNP/2008, Notice of Patent Grant in India dated Jan. 23, 2014, 1 page.
Co-pending application No. CN 200980117175.8, Notification of Completion for Formalities and Notification of Patent Grant in China, with translation, dated Jan. 10, 2014, 4 pages.
Co-pending Application No. JP 2010-550913, Response to Office Action filed Jan. 31, 2014, 7 pages.
Co-pending Application No. JP 2010-550913, Response to Office Action, English version of response and claims, filed Jan. 31, 2014, 6 pages.

\* cited by examiner

CELLULOSE-SOLVENT-BASED LIGNOCELLULOSE FRACTIONATION WITH MODEST REACTION CONDITIONS AND REAGENT CYCLING

This application is a U.S. National Stage application of PCT/US2006/011411, filed 29 Mar. 2006, the entire disclosure of which is hereby incorporated herein by reference in its entirety.

FIELD OF THE INVENTION

The present invention relates to the field of pretreatment and fractionation processes for converting lignocellulosic biomass into cellulose, hemicellulose sugars, lignin, and acetic acid.

BACKGROUND OF THE INVENTION

Biorefineries could become the foundation of industrial development in the twenty-first century. The biorefinery is similar in concept to the petroleum refinery, except that it is based on conversion of biomass feedstocks rather than crude oil. Biorefineries in theory can utilize multiple forms of biomass to produce a flexible mix of products, including chemicals, fuels, power, heat, and materials.

The biorefinery concept has already proven successful in the global agricultural and forest-products industries, where such facilities now produce food, feed, fiber, or chemicals, as well as heat and electricity to run plant operations. Biorefineries have long been in place in the pulp and paper industry, wherein hardwood or softwood is converted into pulp for papermaking and other uses. Currently, the high processing costs and the narrow margin between feedstock costs and product value are important obstacles to commercialization beyond these traditional industries.

The growth of the biorefining industry relies on the efficient conversion of not just wood, but many other types of lignocellulosic biomass which are abundantly available annually. Examples of such lignocellulosic biomass include hardwood, softwood, recycled paper, waste paper, forest trimmings, pulp and paper waste, corn stover, corn fiber, wheat straw, rice straw, sugarcane bagasse, and switchgrass. Efficient conversion includes overcoming one of the key technical challenges for the emerging biorefining industry: the recalcitrance of the cellulose contained in naturally occurring lignocellulosic biomass. Overcoming the recalcitrance of cellulose so that it can be depolymerized to glucose is important, as glucose is a biorefinery platform intermediate that can be fermented or reacted to a wide variety of industrially relevant chemicals, such as ethanol, citric acid, and the like.

Lignocellulosic biomass typically contains 35-50 wt % cellulose, 15-35 wt % hemicellulose, and 5-30 wt % lignin, depending on its origin (Zhang and Lynd, 2004; Klein and Snodgrass, 1993; Wyman, 1994). Although cellulose, hemicellulose, and lignin are usually the major components of lignocellulosic biomass, there also exist varying amounts of other materials present in both bound and unbound forms. These minor components include proteins, uronic acids, acetic acid, ash, free sugars such as sucrose, soil, and foreign materials such as metals originating from harvest operations.

Cellulose is nature's most abundant polymer and is a polymer of glucose. The glucose molecules are joined by β-1,4-glycosidic linkages which allow the glucose chains to assume an extended ribbon conformation. Hydrogen bonding between chains leads to the formation of flat sheets that lay on top of one another in a staggered fashion. As a result, cellulose is very chemically stable and serves as a structural component in plant walls (Paster et al., 2003).

Hemicellulose is a polymer containing primarily 5-carbon sugars such as xylose and arabinose with some glucose and mannose dispersed throughout. Hemicellulose forms a polymer that interacts with cellulose and lignin in the plant wall, strengthening it.

Lignin helps bind the cellulose-hemicellulose matrix while adding flexibility. The molecular structure of lignin polymers is random and disorganized and consists primarily of carbon ring structures (benzene rings with methoxyl, hydroxyl, and propyl groups) interconnected by polysaccharides.

The recalcitrance of lignocellulosic biomass is believed to be caused by (i) the complicated linkages among several main polysaccharides—cellulose, hemicellulose, and lignin, which restrict the hydrolysis action of cellulases, hemicellulases, and laccases; and (ii) the inherent properties of cellulosic material—low substrate accessibility to cellulases, high degree of polymerization, and poor solubility of cellulose fragments in water (Zhang and Lynd, 2004). The lignin-hemicellulose matrix encases cellulose and prevents access of cellulase enzymes to the cellulose phase. Cellulose and hemicellulose in native lignocellulosic biomass are only slightly digestible by cellulase and hemicellulase enzymes.

Pretreatment of lignocellulosic biomass has been an actively researched field for several decades, and a wide variety of thermal, mechanical, and chemical pretreatment approaches (and combinations thereof) have been investigated and reported in the scientific literature (McMillan, 1994). The objective of pretreatment, historically, has been to break up the linkages among cellulose, hemicellulose, and lignin by removing lignin and/or hemicellulose, to produce enzymatically digestible cellulosic solids. The aim has been to maximize conversion of carbohydrate polymer to the desired monomer while minimizing the loss of the desired monomer to degradation products.

Modern pretreatment approaches have evolved from traditional thermochemical biomass-hydrolysis processes that were developed prior to World War II (McMillan, 1994). These processes typically employed cooking of biomass with an acid catalyst (often hydrochloric or sulfuric acid) in a pressurized reactor to hydrolyze the cellulose fraction of biomass to glucose. In such processes, yields of glucose are typically no higher than about 60%, as the harsh conditions required for cellulose hydrolysis result in a significant fraction of the released glucose being converted to non-fermentable sugar degradation products such as 5-hydroxymethylfurfural. In addition, single-stage processes designed for cellulose hydrolysis resulted in the loss of pentose carbohydrates ($C_5$ sugars) from the hemicellulose fraction.

The discovery of cellulase enzymes and the subsequent development of an industrial cellulase industry, coupled with the availability of efficient pentose-fermenting microorganisms, have dramatically altered the way in which the pretreatment of biomass is approached. Rather than requiring a thermochemical process to hydrolyze cellulose to glucose, the aim of many pretreatment approaches is to produce a solid substrate in which the cellulose can be efficiently digested (depolymerized to glucose) by cellulase enzymes.

Pretreatment of lignocellulosic biomass is often the most costly step in an overall conversion process, and it impacts the cost of most other operations including the reduction in size of the feedstock prior to pretreatment, as well as enzymatic hydrolysis and fermentation after pretreatment. Pretreatment can be strongly associated with downstream costs involving enzymatic hydrolysis, power consumption, product concentration, detoxification of inhibitors, product purification, power generation, waste-treatment demands, and other process operations (Wooley et al., 1999; Wyman et al., 2005).

Intensive lignocellulose-pretreatment efforts have been undertaken during the past several decades, but current technologies have not yet been commercialized on a large scale due to high processing costs and great investment risks (Wyman et al., 2005). Many pretreatment technologies employ severe reaction conditions resulting in degradation of sugars and formation of inhibitors, and generally high processing costs.

In general, there is good agreement in the art that amorphous cellulose is more digestible than crystalline cellulose. Hydrolysis of amorphous cellulose requires less catalyst and shorter reaction time, and has higher sugar yields, as compared with that of crystalline cellulose. Amorphous cellulose can be regarded as a homogenous substrate with at least an order of magnitude higher reaction rate than that of crystalline cellulose hydrolysis by acids (Fengel and Wegener, 1984) or cellulose enzymes (Zhang and Lynd, 2005).

A review of the pretreatment art (Chang and Holtzapple, 2000) found that the enzymatic reactivity of lignocellulosic biomass correlates most closely with lignin content and cellulose crystallinity, which both relate to the accessibility of the cellulose. It is therefore recognized that an efficient lignocellulosic-biomass pretreatment process comprises decrystallizing part of the cellulose, rendering it amorphous, as well as removing some of the lignin from the starting material. It is also desired to fractionate the biomass such that hemicellulose sugars and acetic acid can be recovered.

What is needed is an efficient pretreatment and/or fractionation technology for lignocellulosic biomass, wherein cellulose is decrystallized, lignin is substantially removed and recovered, hemicellulose sugars are substantially removed and recovered, and wherein the process conditions for performing the reactive separation do not degrade the extracted sugars or produce appreciable quantities of inhibitors for downstream fermentation.

Another economic obstacle for the fractionation of lignocellulosic biomass is that large quantities of solvent are generally required, leading to high capital and operating costs for the plant. Therefore, what is needed is a process that can achieve the benefits characterized above, using relatively low quantities of solvent, such as solvent/solid ratios of about 5 or less.

It is further desirable that such an efficient pretreatment and/or fractionation technology would be flexible for a variety of biomass feedstocks and co-product options, and would require modest process conditions so as to be economical.

SUMMARY OF THE INVENTION

The present invention addresses several needs in the art, including utilization of all major components of lignocellulosic biomass by fractionating and recovering cellulose, hemicellulose, lignin, and acetic acid; the production of highly amorphous cellulose which can be readily converted into glucose; and efficient solvents allowing modest process conditions that translate to relatively low capital and operating costs.

In some embodiments of the invention, a process for the fractionation of lignocellulosic biomass is provided. Some embodiments of the invention teach solvent combinations that are effective for fractionating lignocellulosic biomass. Some embodiments of the present invention describe highly reactive amorphous cellulose that can be produced and thereafter readily converted into glucose for fermentation or other uses. Some embodiments of the invention provide a system for the fractionation of lignocellulosic biomass into cellulose, hemicellulose, lignin, and acetic acid.

Embodiments of the invention can be described by the following process steps, which also relate to elements of a system of the invention:

Step (i) provides lignocellulosic biomass, which can be for example hardwood, softwood, recycled paper, waste paper, forest trimmings, pulp and paper waste, corn stover, corn fiber, wheat straw, rice straw, sugarcane bagasse, or switchgrass. The lignocellulosic biomass may have been modified prior to step (i). For example, reduction of particle size, washing, modifying the moisture content, or conditioning may have been performed on part or all the feedstock before subjecting to the process and system of the present invention.

Step (ii) combines a first solvent with the lignocellulosic biomass, dissolving some, preferably at least 50%, more preferably at least 90%, and most preferably substantially all of the cellulose and hemicellulose present.

Step (iii) combines a second solvent with the material from step (ii), precipitating some, preferably at least 50%, more preferably at least 90%, and most preferably substantially all of the amorphous cellulose and dissolved hemicellulose, and extracting some, preferably at least 50%, and more preferably at least 75% of the lignin.

The first solvent comprises one or more chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, cadmium monoxide/ethylenediamine (cadoxen), and water. In some preferred embodiments, the first solvent comprises polyphosphoric acid.

The second solvent comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water. In some preferred embodiments, the second solvent comprises acetone.

In some embodiments, the invention further comprises the following steps:

Step (iv) combines a third solvent (which may be the same as or different than the second solvent) with the material from step (iii) to wash the first solvent and lignin from the solid amorphous cellulose, and then separates the solid phase from the black liquor. In some preferred embodiments, this third solvent also comprises acetone, to reduce the complexity of downstream solvent recovery.

Step (v) combines a fourth solvent, which preferably comprises water, with the solid phase from step (iv) to wash the second and/or third solvents and hemicellulose sugars from the solid amorphous cellulose, and then separates the solid phase from the light liquor.

In some embodiments, the invention further comprises the following steps, which need not necessarily be performed in sequential order:

Step (vi) separates the black liquor into the first solvent, the second solvent, and/or the third solvent, a lignin-rich liquid, and acetic acid. Preferably, removal of the second and/or third solvent reduces the lignin solubility such that lignin precipitates, thereby increasing the efficiency of step (vii) that follows.

Step (vii) recovers low-molecular-weight lignin from the lignin-rich liquid in step (vi).

Step (viii) separates the light liquor into soluble hemicellulose sugars and one or more of the second solvent, the third solvent, and the fourth solvent.

Step (ix) further recovers the first solvent from a process stream exiting step (viii). The recovered solvent can be stored or recycled for use in step (ii).

Various secondary steps may be desirable to further purify or otherwise treat the solvents prior to recycling them back into the process or system.

DETAILED DESCRIPTION OF EMBODIMENTS OF THE INVENTION

In the process of the present invention, lignocellulosic biomass is fractionated into cellulose, hemicellulose sugars, lignin, and acetic acid. "Lignocellulosic biomass" can be a wide variety of materials, such as hardwood, softwood, recycled paper, waste paper, forest trimmings, pulp and paper waste, corn stover, corn fiber, wheat straw, rice straw, sugarcane bagasse, switchgrass, and mixtures of one or more types of lignocellulosic biomass. One skilled in the art will recognize that other cellulose-containing feedstocks exist and can be fractionated by practicing the methods of the present invention.

In general, the lignocellulosic biomass is in the form of a particulate, but particle size is not regarded as critical. Particle-size reduction may be performed in conjunction with the methods of the invention, in order to provide convenient processing of solid lignocellulosic biomass.

As used herein, "fractionation" means the removal of at least some cellulose from a lignocellulosic-biomass feedstock. "Pretreatment" means that the cellulose phase of the lignocellulosic biomass is modified in some way, such as a change in crystallinity, degree of polymerization, surface area, binding to hemicellulose and/or lignin, and solubility in a certain solvent.

As used herein, "amorphous cellulose" means the disrupted physical state of the cellulose molecules while in solution and for that period of time after precipitation and before reversion to the highly ordered crystalline structure associated with native cellulose. As is well known, when in such amorphous state, cellulose is much more readily hydrolyzable compared to the crystalline, native state.

Separation of "substantially all" of a component from a starting material means that the amount of the component remaining in the starting material is such that its concentration is at or below the detection limit of standard analytical techniques. Detection limits can be 1% or less, depending on the component and the technique.

Unless otherwise indicated, all numbers expressing concentrations of components, reaction conditions, separation conditions, and so forth used in the specification and claims are to be understood as being modified in all instances by the term "about". Accordingly, unless indicated to the contrary, the numerical parameters set forth in the following specification and attached claims are approximations that may vary depending at least upon the specific analytical technique. The numerical values set forth are reported as precisely as possible. Any numerical value, however, inherently contains certain errors necessarily resulting from the standard deviation found in their respective testing measurements.

Figure 1:
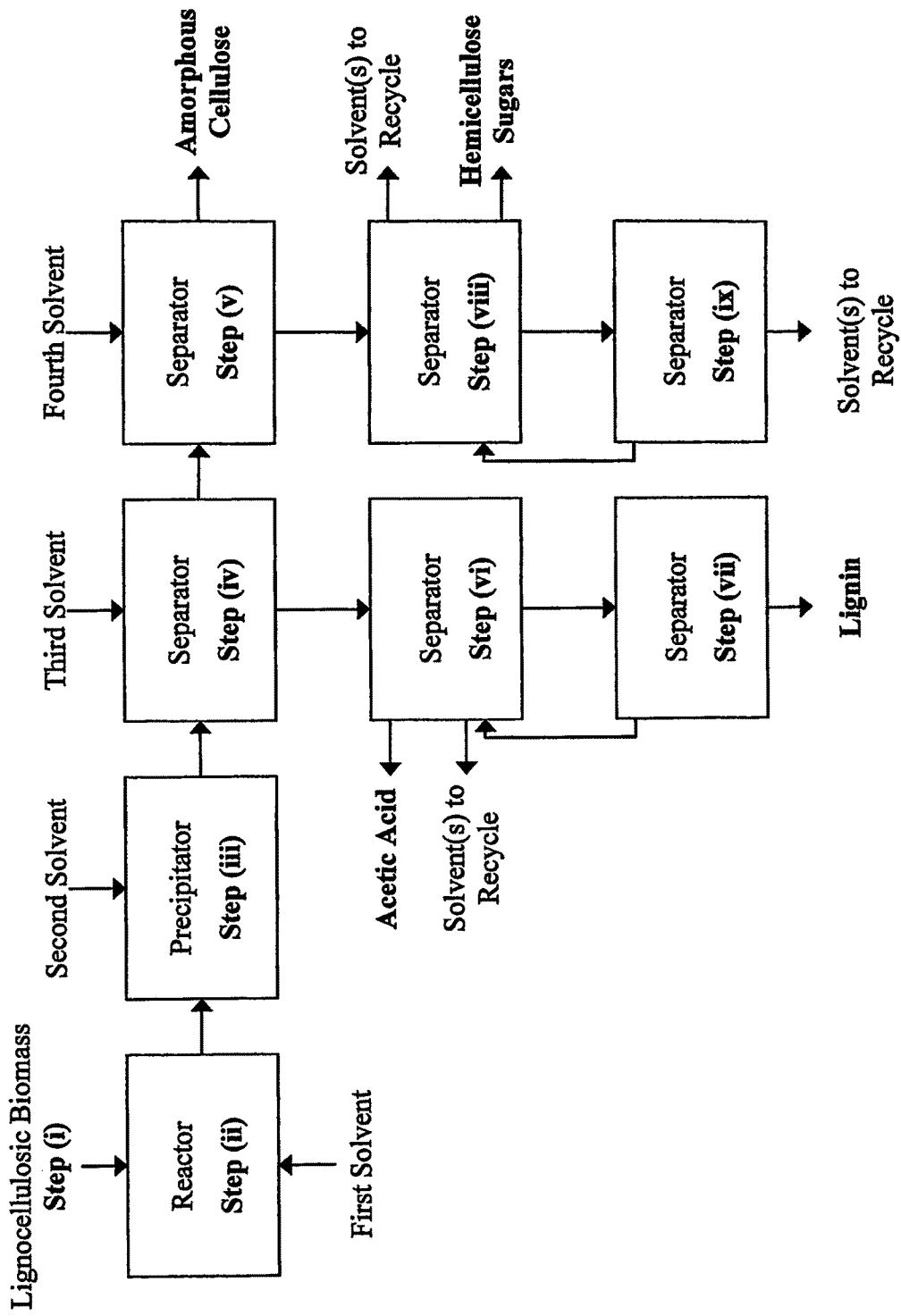
FIG. 1 depicts a block-flow diagram representing several embodiments of the fractionation process for lignocellulosic biomass, according to the present invention.

The invention can be understood by reference to the block-flow diagram in FIG. 1, which depicts several embodiments but is not intended to limit the scope of the claimed invention. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be regarded as limiting in any way. Furthermore, some embodiments of the present invention encompass fewer than all of the described steps, as is described herein. Also, steps (iv)-(ix) are not necessarily sequential.

Step (i) provides lignocellulosic biomass.

Step (ii) combines a first solvent with the lignocellulosic biomass, dissolving some of the cellulose and hemicellulose present. The solvent may comprise some catalytic activity to moderately hydrolyze cellulose and hemicellulose into small fragments, as further described below.

Step (iii) combines a second solvent with the material from step (ii), precipitating some of the amorphous cellulose and dissolved hemicellulose, and extracting some of the lignin.

Step (iv) combines a third solvent with the material from step (iii) to wash the first solvent and some lignin from the solid amorphous cellulose, and then separates the solid phase from the black liquor.

Step (v) combines a fourth solvent with the solid phase from step (iv) to wash the second and/or third solvents and some hemicellulose sugars from the solid amorphous cellulose, and then separates the solid phase from the light liquor.

Step (vi) separates the black liquor into the first solvent, the second solvent, and/or the third solvent, a lignin-rich liquid, and acetic acid. Preferably, removal of the second and/or third solvent reduces the lignin solubility such that lignin precipitates, thereby increasing the efficiency of step (vii) that follows.

Step (vii) recovers low-molecular-weight lignin from the lignin-rich liquid in step (vi).

Step (viii) separates the light liquor into soluble hemicellulose sugars and one or more of the second solvent, the third solvent, and the fourth solvent.

Step (ix) further recovers the first solvent from a process stream from step (viii).

The following description will enable a person of ordinary skill in the art to practice the present invention.

According to FIG. 1, lignocellulosic biomass is provided in step (i). One skilled in the art of biomass pretreatment or fractionation will recognize that there are a number of possible preparation procedures that can be performed on the lignocellulosic biomass feedstock, prior to the reactor in step (ii). Some examples of preparation include reduction of particle size through grinding, milling, chopping, and the like; washing to remove soil and/or other foreign particles; modifying the moisture content of the solids; and conditioning such as through certain storage conditions. The desirability to use such preparation procedures (and others) will depend on the type and source of the lignocellulosic biomass, the choice of downstream equipment, and to some extent on the desired product mix. The economic-optimum process conditions for subsequent steps will sometimes depend on how the feedstock is prepared, but it does not require undue experimentation to understand the influence of feedstock preparation on fractionation efficiency, according to the methods of the present invention.

In any of steps (ii)-(v), the reactor or separator ("vessel") can generally be a continuously stirred tank, a continuous tubular reactor, or a batch tank. Any vessel can work provided there is a means for moving solid and liquid material into and out of the system (and in the case of step (ii), means for a vapor stream). The vessel contents are preferably mixed to some extent, in order to reduce mass-transfer limitations between the solvent and the solid phase, and to enhance the rate of approach towards phase equilibrium. Materials of construction are chosen based on the selected solvent and process conditions, and the desired flexibility for the particular vessel. In general, special vessels are not necessary due to the modest process conditions for practicing this invention.

In step (ii), lignocellulosic biomass and a first solvent are fed to a reactor. The first solvent for step (ii) is selected so as to dissolve some of the cellulose present in the starting solid phase. By "cellulose solvent" is meant a liquid that is able to penetrate the cellulose-hemicellulose-lignin matrix and dissolve cellulose, which can occur by several mechanisms. One possible mechanism, for example, relates to swelling the cellulose and providing the solvent access to the crystalline cellulose molecules. However, swelling does not necessarily lead to dissolution; likewise, dissolution can occur without swelling per se. "Cellulose dissolution" by a cellulose solvent comprises a transition from a two-phase system to a one-phase system, in which the original supramolecular structure of cellulose is destroyed (Klemm et al., 1998). Other mechanisms for dissolution relate to reversible chemical reactions between the solvent and the cellulose-hemicellulose-lignin matrix. The solvent may contain catalytic activity such that at least one of its components is able to break up linkages among cellulose, hemicellulose, and lignin, and/or is able to moderately hydrolyze cellulose and/or hemicellulose into small fragments. In some embodiments, hemicellulose is hydrolyzed in step (ii) such that the hemicellulose oligomers possess good solubility in water, which tends to increase the efficiency of separation in step (v), if present. The amorphous cellulose and cellulose oligomers will not generally have good solubility in water, which allows for clean separation (if desired) of cellulose and hemicellulose in step (v).

Preferably, the first solvent dissolves at least 50%, at least 60%, at least 70%, at least 80%, at least 90%, at least 95%, at least 98%, at least 99%, or more, of the cellulose present. Most preferably, the first solvent dissolves substantially all of the cellulose present. In some embodiments, the first solvent also dissolves at least 50%, at least 60%, at least 70%, at least 80%, at least 90%, at least 95%, at least 98%, at least 99%, or more, of the hemicellulose present.

The solvent for cellulose ("first solvent") comprises one or more chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, cadmium monoxide/ethylenediamine (cadoxen), and water. Effective concentrations will depend at least on the specific solvent(s) selected.

One particularly effective solvent for cellulose is polyphosphoric acid. The following discussion describes features associated with polyphosphoric acid, which is the cellulose solvent (first solvent) for some embodiments of the present invention. Similar features for acid-containing solvents other than polyphosphoric acid will be recognized by a skilled artisan.

By "polyphosphoric acid" it is meant concentrated phosphoric acid, such that any number of polymers of phosphoric acid may be present in solution. Phosphoric acid (also known as orthophosphoric acid) is a common tribasic acid, $H_3PO_4$, having three replaceable hydrogen atoms. When two phosphoric acid molecules are condensed into one molecule, pyrophosphoric acid ($H_4P_2O_7$) is obtained as follows:

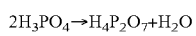

$$2H_3PO_4 \rightarrow H_4P_2O_7 + H_2O$$

This process can be repeated to increase the average degree of polymerization of the phosphoric acid present. Polyphosphoric acid molecules can have dozens of such phosphoric units bonded in a row. A general formula for polyphosphoric acid is $HO(PO_2OH)_xH$ where x is the number of phosphoric units in the molecule. Any concentrated solution will have a distribution of degrees of polymerization. Polyphosphoric acid imparts catalytic activity towards hydrolysis of cellulose and hemicellulose during step (ii), and the specific activity is a function of the degree of polymerization.

The phosphoric acid units can be bonded together in cyclic structures forming metaphosphoric acid molecules. The simplest such compound is trimetaphosphoric acid or cyclotriphosphoric acid, $H_3P_3O_9$.

The third —OH group on a polyphosphoric acid repeat unit can also be used for condensation with other phosphoric groups to form branches in the polyphosphoric acid chains. The cyclic four-phosphate unit that double-branches, to remove all water, creates phosphoric anhydride, $P_4O_{10}$, which is often written empirically as $P_2O_5$. $P_2O_5$ is also the oxidized phosphorous compound that is produced by burning (or otherwise oxidizing) solutions of phosphoric acid or polyphosphoric acid, as for example during solvent-recovery operations. Although $P_2O_5$ is not formally a proton donor, for the purposes of the present invention $P_2O_5$ is considered to be a phosphoric compound belonging to "polyphosphoric acid". Polyphosphoric acid is water-soluble. In aqueous solutions, water will hydrolyze polyphosphoric acid into smaller units and finally into monomeric phosphoric acid ($H_3PO_4$), given enough water. The rate at which the solution approaches the equilibrium distribution of molecular weights by hydrolysis will depend on at least temperature and pH. High temperature and low pH tend to cause faster hydrolysis.

In polyphosphoric acid, any number of the somewhat acidic —OH groups in them can dissociate to become negatively charged oxygen sites, forming numerous combinations of multiple-charged polyphosphate anions. In an aqueous solution, the degree of dissociation will depends on the pH. Polyphosphoric acid can form polyphosphates by replacing one or more available hydrogen atoms with one or more other positive ions. Salts or esters of polyphosphates can then be formed, depending on which cations are present in the reactor.

As is known, lignocellulosic biomass may contain various salts and buffering components that can contribute cations to the solution. Some examples of polyphosphate salts that can be produced in step (ii) are calcium phosphate, $Ca_3(PO_4)_2$; monobasic calcium phosphate, $Ca(H_2PO_4)_2$; dibasic calcium phosphate, $CaHPO_4$; tribasic calcium phosphate, $Ca_3(PO_4)_2$; ammonium phosphate, $(NH_4)_2HPO_4$; sodium hexametaphosphate, $Na_6P_6O_{18}$; and oligomers thereof. Generally, the concentration of polyphosphate salts will be minor, and their presence does not necessarily decrease the efficiency of step (ii) or any downstream operations. For the purpose of the present invention, "polyphosphoric acid" is meant to include the various polyphosphate salts that can also be formed.

Without being limited by any particular theory, cellulose dissolution in polyphosphoric acid involves two main processes: (1) an esterification reaction between alcoholic hydroxyl groups of cellulose and polyphosphoric acid to form cellulose polyphosphate, and (2) a competition of hydrogen-bond formation between hydroxyl groups of cellulose chains and hydrogen-bond formation between one hydroxyl group of a cellulose chain and a water molecule or with a hydrogen ion. Cellulose polyphosphate reversibly converts back to free polyphosphoric acid and amorphous cellulose without any significant substitution and recrystallization. Polyphosphoric acid dissolves cellulose rapidly and at low temperatures, in part because of the fast diffusivity of the hydrogen ions from polyphosphoric acid into the heterogeneous cellulose phase. The regenerated cellulose remains amorphous and has high reactivity.

The second solvent for step (iii) is selected principally so as to precipitate at least 50%, at least 60%, at least 70%, at least 80%, at least 90%, at least 95%, at least 98%, at least 99%, or more, of the amorphous cellulose present in the mixture produced in step (ii). Most preferably, the second solvent precipitates substantially all of the amorphous cellulose. The precipitation is believed to be caused by a reduction in solubility of dissolved cellulose such that phase separation occurs, wherein a solid phase containing amorphous cellulose can be recovered.

In some embodiments, the second solvent also precipitates at least 50%, at least 60%, at least 70%, at least 80%, at least 90%, at least 95%, at least 98%, at least 99%, or more, of the dissolved hemicellulose present in the mixture produced in step (ii).

In some embodiments, the second solvent also dissolves some lignin that is present in the mixture. Dissolving lignin into the solvent during step (iii) will lead to cellulose and hemicellulose of higher purity, which is believed to be advantageous for conversion to glucose and hemicellulose sugars downstream, and will increase the amount of lignin that can be recovered during step (vii) below. Preferably, the second solvent extracts into the liquid phase at least 50%, at least 60%, at least 70%, at least 80%, at least 90%, at least 95%, at least 98%, at least 99%, or more, of the lignin present in the lignocellulosic biomass. Most preferably, 75% or greater of the total lignin in the starting material is dissolved during step The second solvent for step (iii) comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water. During step (iii), any number of different chemicals may be added sequentially, but the second solvent will comprise at least one of these chemicals.

One skilled in the art will recognize that other solvents exist that have the desired properties for step and that selection of the second solvent may be impacted by the choice of the first solvent in step (ii). The second solvent is preferably volatile so that it can be recovered economically in steps (vi) and/or (viii). However, the second solvent need not have any particular volatility, as long as it is effective for precipitating cellulose and hemicellulose and for dissolving lignin.

The third solvent for step (iv), if present, is selected so as to provide a means of washing the amorphous cellulose of the first solvent, the second solvent, and lignin. As is known, significant delignification (removal of lignin) can occur during washing steps after pretreatment, because mechanical forces (for any solvent) and/or thermodynamic driving forces (for solvents that dissolve lignin) favor the removal of loosely bound lignin from the cellulose into the solvent phase. The third solvent comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water. In preferred embodiments, the third solvent is the same as the second solvent, but it need not be. For example, the third solvent could comprise hot water, removing some lignin by primarily mechanical forces, such as would be experienced during simple filtration.

The fourth solvent for step (viii), if present, is selected primarily to solubilize the hemicellulose sugars (monomers and/or oligomers). Examples of hemicellulose sugars that could be present include xylose, arabinose, galactose, mannose, and glucose (hemicellulose often contains some glucan, which is the main component of cellulose). The fourth solvent should also be able to wash other residual solvents from the amorphous cellulose. The residual solvents are one or more of the first solvent, the second solvent, and the third solvent. An aqueous solution is a preferred fourth solvent because hemicellulose sugars are generally water soluble, and especially when the previous solvents in the process are water-soluble. The fourth solvent preferably comprises one or more materials selected from the group consisting of liquid water, steam, recycle water, process condensate, fermentation-broth condensate, and carbon dioxide.

The quantity of solvents used throughout the process, relative to the quantity of total lignocellulosic biomass, has a significant impact on process economics, as is well known. In the present invention, the effective solvent concentration for any step will depend to some extent at least on solvent type, temperature, pH, residence time, and equipment configuration.

By "solvent/solid ratio" is meant the mass ratio of total solvent present divided by the total mass of the solid phase present in a particular step. If the step comprises a continuous separation, e.g. a fixed bed of solids through which passes a liquid solvent, then the solvent/solid ratio is calculated by dividing the total mass of solvent fed in one residence time by the total mass of solids treated in that same residence time.

In step (ii), the solvent/solid ratio for the first solvent is less than about 10, preferably less than about 5, more preferably less than about 3, and most preferably about 2.

In step the solvent/solid ratio for the second solvent is less than about 50, preferably less than about 20, more preferably less than about 10, and most preferably less than about 5.

In step (iv), the solvent/solid ratio for the third solvent is less than about 50, preferably less than about 20, more preferably less than about 10, and most preferably less than about 5.

In step (viii), the solvent/solid ratio for the fourth solvent is less than about 100, preferably less than about 50, more preferably less than about 20, and most preferably less than about 10.

In preferred embodiments of the present invention, severe reactor temperatures are not necessary. The temperature in step (ii) can be ambient temperature (about 25° C.), or it can be from about 20° C. to about 80° C. A preferable temperature for step (ii) is about 50° C. Temperatures for all other steps of the present invention can also be from about 20° C. to about 80° C. During any of the steps, the temperature may change (intentionally or otherwise). The specific temperatures for any process steps are not regarded as critical, and operating outside of about 20-80° C. should not necessarily be construed as representing an embodiment that is outside the scope of the present invention. As is known, however, excessive temperatures will often cause undesirable side reactions, such as hydrolysis of sugar oligomers; degradation of soluble sugars to e.g. furfural or hydroxymethylfurfural; and reactions forming complexes among sugars, lignin, and solvents.

The pH is another process parameter usually of interest. The pH in any of the steps of the invention is not limited to any particular range, because the performance criteria can be met for many different solvents (with wide-ranging pKa values). The pH of the liquid phase will influence the kinetics of side reactions, beyond the effect of temperature, but the low temperatures as taught above translate into process flexibility with regards to pH. In some embodiments, the pH in step (ii) is between about 1 and about 2, and the pH values in steps (iii)-(v) are between about 4 and about 8. In other embodiments, the pH values will be different.

The residence times of the various steps are also not regarded as critical, provided that the intended function is accomplished. Again, the low temperatures reduce the necessity for tight control of reactor (or separator) residence times. For purposes of illustration and to completely enable the present invention, in some embodiments the residence times of the individual steps (ii)-(v) are between about 5 minutes and about 4 hours, preferably about 30 minutes, chosen simply for convenience.

Most preferably, each step is optimized to be just long enough to accomplish a nearly uniform distribution of the contents and to achieve phase equilibrium, so that separation/washing is most effective. Longer times would be wasteful from an overall plant-capacity standpoint, but they would not generally limit the effectiveness of the biomass fractionation. As is appreciated in the process industries, flexibility with residence times or batch times of various unit operations is important to mitigate process upsets and ultimately provide a robust manufacturing plant.

The pressures of the various steps of the invention are also flexible. For convenience, all pressures are chosen to be approximately 1 bar. Pressures that are too low could cause solvent losses, while high pressures usually translate into more-expensive equipment. Preferably, the pressures are chosen to be from about 0.1 bar to about 2 bar throughout the process of the invention. Higher pressures may be necessary for certain solvents that are volatile and for higher temperatures (i.e., near 80° C.). Most preferably, all steps are operated at or close to atmospheric pressure.

Beyond the characteristics discussed above that can produce highly reactive amorphous cellulose, an economically viable lignocellulosic-biomass fractionation process must recycle its solvents, and must recover usable hemicellulose sugars and lignin. Steps (vi)-(ix) are intended to recover solvents, hemicellulose sugars, acetic acid, and lignin.

In step (vi), the black liquor from step (iv) is fed to a separation unit operation selected from the group consisting of distillation, single-stage evaporation (flash), multiple-effect evaporation, thermocompression, and venturi scrubbing. In preferred embodiments, a distillation column is employed, the column provided with enough stages such that substantially pure second solvent (or a combination of second and third solvents, if they are different) can be withdrawn. The withdrawal is preferably near the top of the column if the second solvent is a low-boiling solvent, such as acetone. This recovered second solvent can then be stored in a tank, or recycled back into the process at steps requiring that solvent.

Additionally, the first solvent, or a stream containing the first solvent, can be withdrawn directly from the separator in step (vi). In some preferred embodiments wherein step (vi) comprises a distillation column and wherein the first solvent is polyphosphoric acid, a material stream can be withdrawn near the bottom of the column. This stream could be recycled directly back to step (ii), but preferably, is sent to a furnace or other means for oxidation, wherein the exit stream comprises $H_2O$ (steam), $CO_2$, and $P_2O_5$.

Recovering the polyphosphoric acid in this way presents several advantages that can be realized in various embodiments. First, an oxidation step significantly purifies the first solvent and can be accomplished in high yields. Second, the ratio of $P_2O_5$ to steam can be adjusted prior to recycling to step (ii), modifying the average molecular weight, and thus properties, of the polyphosphoric acid solvent. Third, the concentration of $P_2O_5$ can be adjusted based on the moisture content of the incoming biomass from step (i), since the recovered and recycled $P_2O_5$ will react with the water in the biomass feedstock to produce polyphosphoric acid. Fourth, the energy content of the steam from this recovery step is recovered in step (ii) when it is desired to heat the contents of the reactor. Fifth, feeding the recycled first solvent as a vapor stream of water and $P_2O_5$, rather than liquid polyphosphoric acid, is advantageous because mass transfer of the solvent into the solid phase will be faster. Finally, it is possible to fully utilize all of the chemicals from the oxidative recovery, since in addition to $P_2O_5/H_2O$ being recycled to step (ii), the $CO_2$ could be recycled to the washing operation in step (v).

Also in step (vi), acetic acid is recovered from the separation unit. In embodiments that use distillation, acetic acid can be withdrawn directly from the column. Depending on the desired use for the acetic acid, further purification outside of step (vi) may be necessary.

Removing one or more solvents for lignin in step (vi) will reduce the lignin solubility such that lignin precipitates. A liquid containing precipitated lignin can be withdrawn from the separator in step (vi), which in the case of a distiller will usually be near the bottom of the column. The lignin-rich liquid could be used directly (such as for energy generation). Alternately, it can be fed to a solid/liquid separation operation in step (vii) wherein liquid is removed and returned to step (vi), and the solid comprises low-molecular-weight lignin. The solid/liquid separator is preferably a centrifuge, but it can also be a filtration device, electrostatic separator, adsorption or absorption column, or any other means for separating liquids from solids. The low-molecular-weight can further be dried if desired.

In step (viii), the light liquor from step (v) is fed to a separation unit operation selected from the group consisting of distillation, single-stage evaporation (flash), multiple-effect evaporation, thermocompression, and venturi scrubbing. In some embodiments, the separator for step (viii) is a flash tank wherein the vapor comprises recovered solvent and the liquid comprises soluble hemicellulose sugars. In other embodiments, a distillation column is employed, such column provided with enough stages such that at least one solvent can be withdrawn (near the top of the column if one of the solvents is a low-boiling solvent, such as acetone). The column can also be designed in order to withdraw several different solvents. These recovered solvents can be stored in tanks, or recycled back into the process at steps requiring those particular solvents.

The soluble hemicellulose sugars from step (viii) can be used directly, for example by feeding into a fermentor to produce ethanol; can be stored in tanks or by other means; or can be used for other purposes. A liquid stream comprising the first solvent can also be withdrawn from the step-(viii) separator, and fed to a solid/liquid separation unit in step (ix) wherein liquid is removed and returned to step (viii), and the solid comprises the first solvent. The solid/liquid separator is preferably a centrifuge, but it can also be a filtration device or any other means for separating liquids from solids. The first solvent can be combined with the recovered first solvent from step (vi), or otherwise recovered and recycled.

Although several vessel-specific process parameters described herein are not critical to define the metes and bounds of the invention, one skilled in the art knows that there will be certain preferable combinations of these parameters, in order to provide an economical process for fractionating biomass. Optimizing the conditions of the distinct steps is best done by optimizing the entire process, which can involve process modeling and simulation, testing of various conditions relative to the feedstock selected, understanding the influence of certain site-specific criteria, and the like.

By practicing the methods of the invention, lignocellulosic biomass is fractionated into amorphous cellulose, hemicellulose sugars, lignin, and acetic acid. In preferred embodiments, the product yields are high. "Yield" is the mass of a certain product recovered, divided by the theoretical maximum based on the amount present in the initial lignocellulosic biomass (accounting for water addition to hydrolyze cellulose and hemicellulose). "Net yield," as used herein, is calculated as the mass of a product divided by the mass of starting feedstock. In order to arrive at such a number, one simply needs to multiply the yields by the mass fraction of the component of interest in the initial feedstock. For example, 50% yield of lignin from a starting feedstock that is 30 wt % lignin would mean a net yield of 15% (e.g., 150 kg lignin per metric ton biomass feedstock).

In some embodiments, the yield of amorphous cellulose is at least 80%, at least 85%, at least 90%, at least 95%, at least 96%, at least 97%, at least 98%, at least 99%, or more. The amorphous cellulose can further be hydrolyzed into glucose in some embodiments, wherein the yield of glucose is at least 80%, at least 85%, at least 90%, at least 95%, at least 96%, at least 97%, at least 98%, at least 99%, or more. In some embodiments, the yield of hemicellulose sugars is at least 70%, at least 75%, at least 80%, at least 85%, at least 90%, at least 95%, at least 96%, at least 97%, at least 98%, at least 99%, or more. In some embodiments, the yield of lignin is at least 50%, at least 60%, at least 70%, at least 80%, at least 90%, at least 95%, at least 98%, at least 99%, or more. In some embodiments, the yield of acetic acid is at least 70%, at least 75%, at least 80%, at least 85%, at least 90%, at least 95%, at least 96%, at least 97%, at least 98%, at least 99%, or more.

Some embodiments of the invention relate to use of a process or a system comprising certain steps to fractionate lignocellulosic biomass into cellulose, hemicellulose sugars, lignin, and acetic acid. Use of a fractionation process or system comprises the following elements:

(i) Use of lignocellulosic biomass.

(ii) Use of a first solvent, dissolving some of the cellulose and hemicellulose present in the lignocellulosic biomass.

(iii) Use of a second solvent, precipitating some of the amorphous cellulose and dissolved hemicellulose from element (ii), and extracting some of the lignin.

(iv) Use of a third solvent to wash the first solvent and some lignin from the solid amorphous cellulose.

(v) Use of a fourth solvent to wash the second and/or third solvents and some hemicellulose sugars from the solid amorphous cellulose.

(vi) Use of a means for separating the black liquor into the first solvent, the second solvent, and/or the third solvent, a lignin-rich liquid, and acetic acid.

(vii) Use of a means for recovering low-molecular-weight lignin from the lignin-rich liquid in element (vi).

(viii) Use of a means for separating the light liquor into soluble hemicellulose sugars and one or more of the second solvent, the third solvent, and the fourth solvent.

(ix) Use of a means for recovering the first solvent from a process or system stream from element (viii).

Some embodiments of the invention relate to use of a combination of solvents, wherein a first solvent is selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide tetrabutylammonium fluoride trihydrate, N-methylmorpholine-N-oxide, and cadmium monoxide/ethylenediamine (cadoxen); and a second solvent is selected from the group consisting of methanol, ethanol, 1-propanol, 2-propanol, acetone, propanal, 1-butanol, 2-butanol, butanal, butanone (methyl ethyl ketone), t-butanol, and water.

Some embodiments of the present invention further comprise use of the fractionated and recovered products—amorphous cellulose, hemicellulose sugars, lignin, and acetic acid. These four products can be used, in various embodiments of the invention, in at least the following ways.

The amorphous cellulose obtained is highly reactive and can readily be converted, or saccharified, to glucose monomers with either cellulose enzymes or with an acid such as sulfuric acid. The glucose can then be fermented into a wide range of industrial products, including ethanol, acetone, organic acids, baker's yeast, or any other product of cellular metabolism of the chosen microorganism for fermentation. As is known in the art, amorphous cellulose can also be directly fermented to products directly by microorganisms, without prior enzymatic or acidic saccharification to glucose.

Likewise, the hemicellulose sugars can be fermented. The profile of hemicellulose sugars will depend on the specific type of feedstock. For example, if the feedstock is hardwood chips or corn stover, the predominant hemicellulose sugar will be xylose. Hemicellulose sugars can also be fermented into ethanol, acetone, organic acids, baker's yeast, or any other product of cellular metabolism of the chosen microorganism for fermentation. The hemicellulose sugars can be combined with the glucose from the amorphous cellulose and fermented together, or fermented separately. Other commercial products that can be manufactured from hemicellulose sugars include feed additives for animals; xylitol, which can be used as a sweetener, and furfural, which has many uses including solvents as well as production of Nylon 6 and Nylon 6,6.

The lignin that is obtained is a high-quality, relatively pure, low-molecular-weight lignin that does not contain sulfur. Lignin can be burned for energy production. Some other potential applications for lignin include carbon-fiber production, asphalt production, and as a component in biopolymers. Persons of ordinary skill in the biomass art will appreciate that there are a large number of potential uses of the lignin that is produced by various embodiments of the present invention.

The acetic acid recovered can be sold or further purified. Acetic acid is an important industrial chemical that is used in the production of polyethylene terephthalate, cellulose acetate, and polyvinyl acetate. Diluted acetic acid is often used in descaling agents; in the food industry, acetic acid is used as an acidity regulator. There is a large global demand for acetic acid, and the ability to capture value from the acetyl groups contained in lignocellulosic biomass is expected to contribute to the economic viability of biorefining using the methods of the present invention.

Embodiments of the present invention can be further understood with reference to the following aspects. By "aspect" it is meant a process, a method, a system, a composition, a use of, and/or a use for the invention.

Aspect 1. A process for fractionating lignocellulosic biomass, the process comprising:
(i) Providing lignocellulosic biomass;
(ii) Providing a first solvent and combining with the lignocellulosic biomass, wherein the first solvent dissolves at least some of the cellulose present in the lignocellulosic biomass; and
(iii) Providing a second solvent and combining with the material from step (ii), wherein at least some of the cellulose that is dissolved by the first solvent in step (ii) precipitates out of the liquid phase.

Aspect 2. The process of aspect 1, wherein the cellulose that precipitates in step (iii) has reduced crystallinity compared to the cellulose provided in step (i).

Aspect 3. The process of aspect 2, wherein the cellulose that precipitates in step (iii) is at least 90% amorphous.

Aspect 4. The process of aspect 1, wherein the second solvent extracts into the liquid phase at least 50% of the lignin present in the lignocellulosic biomass.

Aspect 5. The process of aspect 1, wherein the second solvent extracts into the liquid phase at least 75% of the lignin present in the lignocellulosic biomass.

Aspect 6. The process of aspect 1, wherein during step (ii), the first solvent dissolves at least 50% of the cellulose present in the lignocellulosic biomass.

Aspect 7. The process of aspect 1, wherein during step (ii), the first solvent dissolves at least 90% of the cellulose present in the lignocellulosic biomass.

Aspect 8. The process of aspect 1, wherein during step (ii), the first solvent dissolves substantially all of the cellulose present in the lignocellulosic biomass.

Aspect 9. The process of aspect 1, wherein during step (ii), the first solvent dissolves at least 50% of the hemicellulose present in the lignocellulosic biomass.

Aspect 10. The process of aspect 1, wherein during step (ii), the first solvent dissolves at least 90% of the hemicellulose present in the lignocellulosic biomass.

Aspect 11. The process of aspect 1, wherein during step (ii), the first solvent dissolves substantially all of the hemicellulose present in the lignocellulosic biomass.

Aspect 12. The process of aspect 1, wherein during step (ii), the first solvent dissolves at least 90% of the hemicellulose present in the lignocellulosic biomass and dissolves at least 90% of the cellulose present in the lignocellulosic biomass.

Aspect 13. The process of aspect 1, wherein during step (iii), the second solvent precipitates at least 50% of the dissolved cellulose.

Aspect 14. The process of aspect 1, wherein during step (iii), the second solvent precipitates at least 90% of the dissolved cellulose.

Aspect 15. The process of aspect 1, wherein during step (iii), the second solvent precipitates substantially all of the dissolved cellulose.

Aspect 16. The process of aspect 1, wherein during step (iii), the second solvent precipitates at least 50% of the dissolved hemicellulose.

Aspect 17. The process of aspect 1, wherein during step (iii), the second solvent precipitates at least 90% of the dissolved hemicellulose.

Aspect 18. The process of aspect 1, wherein during step (iii), the second solvent precipitates substantially all of the dissolved hemicellulose.

Aspect 19. The process of aspect 1, wherein during step (iii), the second solvent precipitates at least 90% of the dissolved cellulose and precipitates at least 90% of the dissolved hemicellulose.

Aspect 20. The process of aspect 1, wherein during step the second solvent: precipitates at least 90% of the dissolved cellulose; precipitates at least 90% of the dissolved hemicellulose; and extracts into the liquid phase at least 75% of the lignin present in the lignocellulosic biomass.

Aspect 21. The process of aspect 1, further comprising converting the cellulose that precipitates out of the liquid phase in step (iii) into glucose monomers and/or oligomers.

Aspect 22. The process of aspect 21, wherein converting the cellulose to glucose comprises enzymatic reactions.

Aspect 23. The process of aspect 21, wherein converting the cellulose to glucose comprises acid hydrolysis.

Aspect 24. The process of aspect 1, further comprising recovering and recycling at least one of the solvents back to steps (ii) and/or (iii).

Aspect 25. The process of aspect 1, wherein steps (ii) and (iii) are conducted at one or more temperatures of from about 20° C. to about 80° C.

Aspect 26. The process of aspect 1, wherein steps (ii) and (iii) are conducted at one or more pressures of from about 0.1 bar to about 2 bar.

Aspect 27. The process of aspect 1, wherein the residence times of steps (ii) and (iii) are each from about 5 minutes to about 4 hours.

Aspect 28. The process of aspect 1, wherein one or both of steps (ii) and (iii) are conducted continuously, semi-continuously, or pseudo-continuously.

Aspect 29. The process of aspect 1, wherein one or both of steps (ii) and (iii) are conducted in batches.

Aspect 30. The process of aspect 1, wherein the first solvent in step (ii) comprises one or more chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, cadmium monoxide/ethylenediamine (cadoxen), and water.

Aspect 31. The process of aspect 1, wherein the second solvent in step (iii) comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water.

Aspect 32. The process of aspect 31, wherein at least two chemicals are added in step (iii) in a sequential manner, the chemicals selected from the group consisting of methanol, ethanol, 1-propanol, 2-propanol, acetone, propanal, 1-butanol, 2-butanol, butanal, butanone (methyl ethyl ketone), t-butanol, and water.

Aspect 33. The process of aspect 30, wherein the first solvent in step (ii) comprises polyphosphoric acid.

Aspect 34. The process of aspect 31, wherein the second solvent in step (iii) comprises acetone.

Aspect 35. The process of aspect 31, wherein the second solvent in step (iii) comprises water.

Aspect 36. The process of aspect 32, wherein the second solvent comprises acetone and water.

Aspect 37. The process of aspect 30 or 33, wherein the solvent/solid ratio for step (ii) is less than about 5.

Aspect 38. The process of aspect 37, wherein the solvent/solid ratio for step (ii) is less than about 3.

Aspect 39. The process of aspect 37, wherein the solvent/solid ratio for step (ii) is less than about 2.

Aspect 40. A process for fractionating lignocellulosic biomass, the process comprising:
(i) Providing lignocellulosic biomass;
(ii) Providing a first solvent and combining with the lignocellulosic biomass, wherein the first solvent dissolves at least some of the cellulose present in the lignocellulosic biomass;
(iii) Providing a second solvent and combining with the material from step (ii), wherein at least some of the cellulose that is dissolved by the first solvent in step (ii) precipitates out of the liquid phase;
(iv) Providing a third solvent and combining with the material from step (iii), and then separating the substantially solid phase and black liquor; and
(v) Providing a fourth solvent and combining with the substantially solid phase from step (iv), and then separating the solid phase and light liquor.

Aspect 41. The process of aspect 40, wherein the first solvent in step (ii) comprises one or more chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, cadmium monoxide/ethylenediamine (cadoxen), and water.

Aspect 42. The process of aspect 40, wherein the second solvent in step (iii) comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water.

Aspect 43. The process of aspect 40, wherein the third solvent in step (iv) comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water.

Aspect 44. The process of aspect 40, wherein the fourth solvent from step (v) comprises one or more materials selected from the group consisting of liquid water, steam, recycle water, process condensate, fermentation-broth condensate, and carbon dioxide.

Aspect 45. The process of aspect 40, further comprising subjecting the black liquor, obtained in step (iv), to step (vi), a vapor/liquid separation operation selected from the group consisting of distillation, single-stage evaporation (flash), multiple-effect evaporation, thermocompression, and venturi scrubbing.

Aspect 46. The process of aspect 45 wherein step (vi) comprises distillation.

Aspect 47. The process of aspect 45 or 46, wherein acetic acid is recovered.

Aspect 48. The process of aspect 45 or 46, further comprising recovering at least one solvent selected from the group consisting of the first solvent, the second solvent, the third solvent, and the fourth solvent.

Aspect 49. The process of aspect 48, further comprising recycling at least one of the recovered solvents to one or more of steps (ii)-(v).

Aspect 50. The process of aspect 45 or 46, wherein at least one of the recovered solvents is polyphosphoric acid.

Aspect 51. The process of aspect 45 or 46, wherein at least one of the recovered solvents is acetone.

Aspect 52. The process of aspect 45 or 46, wherein both polyphosphoric acid and acetone are recovered.

Aspect 53. The process of aspect 45, further comprising step (vii), a solid/liquid separation operation selected from the group consisting of a centrifuge, a filtration device, an electrostatic separator, an adsorption column, and an absorption column.

Aspect 54. The process of aspect 53, wherein step (vii) comprises a centrifuge.

Aspect 55. The process of aspect 53 or 54, wherein lignin is recovered.

Aspect 56. The process of aspect 40, further comprising subjecting the light liquor, obtained in step (v), to step (viii), a vapor/liquid separation operation selected from the group consisting of distillation, single-stage evaporation (flash), multiple-effect evaporation, thermocompression, and venturi scrubbing.

Aspect 57. The process of aspect 56 wherein step (viii) comprises a flash tank.

Aspect 58. The process of aspect 56 or 57, wherein hemicellulose sugars are recovered.

Aspect 59. The process of aspect 56 or 57, further comprising recovering at least one solvent used in a different step.

Aspect 60. The process of aspect 59, further comprising recycling at least one of the recovered solvents to one or more of steps (iii)-(v).

Aspect 61. The process of aspect 59 or 60, wherein at least one of the recovered solvents is acetone.

Aspect 62. The process of aspect 56, further comprising step (ix), a solid/liquid separation operation selected from the group consisting of a centrifuge, a filtration device, an electrostatic separator, an adsorption column, and an absorption column.

Aspect 63. The process of aspect 62, wherein step (ix) comprises a centrifuge.

Aspect 64. The process of aspect 62 or 63, further comprising recovering the first solvent.

Aspect 65. The process of aspect 64, further comprising recycling the first solvent to step (ii).

Aspect 66. The process of aspect 40, wherein steps (ii)-(v) are each conducted at one or more temperatures of from about 20° C. to about 80° C.

Aspect 67. The process of aspect 40, wherein steps (ii)-(v) are each conducted at one or more pressures of from about 0.1 bar to about 2 bar.

Aspect 68. The process of aspect 40, wherein the residence times of steps (ii)-(v) are each from about 5 minutes to about 4 hours.

Aspect 69. The process of aspect 40, wherein steps (ii)-(v) are each conducted continuously, semi-continuously, or pseudo-continuously.

Aspect 70. The process of aspect 40, wherein steps (ii)-(v) are each conducted in batches.

Aspect 71. The process of aspect 41, wherein the first solvent in step (ii) comprises polyphosphoric acid.

Aspect 72. The process of aspect 42, wherein the second solvent in step (iii) comprises acetone.

Aspect 73. The process of aspect 42, wherein the second solvent in step (iii) comprises water.

Aspect 74. The process of aspect 41 or 71, wherein the solvent/solid ratio for step (ii) is less than about 5.

Aspect 75. The process of aspect 41 or 71, wherein the solvent/solid ratio for step (ii) is less than about 3.

Aspect 76. The process of aspect 41 or 71, wherein the solvent/solid ratio for step (ii) is less than about 2.

Aspect 77. The process of aspect 40, further comprising converting the cellulose that precipitates out of the liquid phase in step (iii) into glucose monomers and/or oligomers.

Aspect 78. The process of aspect 77, wherein converting the cellulose to glucose comprises enzymatic reactions.

Aspect 79. The process of aspect 77, wherein converting the cellulose to glucose comprises acid hydrolysis.

Aspect 80. The process of any of aspects 21-23 and 77-79, further comprising fermenting some of the glucose.

Aspect 81. The process of aspect 80, wherein one of the fermentation products is ethanol.

Aspect 82. The process of aspect 80, wherein one of the fermentation products is acetone.

Aspect 83. The process of aspect 1 or 40, further comprising fermenting some of the amorphous cellulose directly.

Aspect 84. The process of aspect 83, wherein one of the fermentation products is ethanol.

Aspect 85. The process of aspect 83, wherein one of the fermentation products is acetone.

Aspect 86. The process of any of the preceding aspects, wherein the lignocellulosic biomass in step (i) is selected from the group consisting of hardwood, softwood, recycled paper, waste paper, forest trimmings, pulp and paper waste, corn stover, corn fiber, wheat straw, rice straw, sugarcane bagasse, switchgrass, and mixtures thereof.

Aspect 87. The process of aspect 86, wherein step (i) comprises one or more feedstock modifications selected from the group consisting of reduction of particle size, washing, modifying the moisture content, and conditioning.

Aspect 88. A process for fractionating lignocellulosic biomass, the process comprising:
(i) Providing lignocellulosic biomass;
(ii) Providing polyphosphoric acid and combining with the lignocellulosic biomass, wherein the polyphosphoric acid dissolves at least 90% of the cellulose present in the lignocellulosic biomass;
(iii) Providing acetone and combining with the material from step (ii), wherein at least 90% of the cellulose that is dissolved by the polyphosphoric acid in step (ii) precipitates out of the liquid phase;
(iv) Providing acetone and combining with the material from step and then separating the substantially solid phase and black liquor; and
(v) Providing water and combining with the substantially solid phase from step (iv), and then separating the solid phase and light liquor.

Aspect 89. The process of aspect 88, further comprising separating the black liquor and recovering polyphosphoric acid.

Aspect 90. The process of aspect 89, wherein recovering polyphosphoric acid comprises burning a process stream and recycling $P_2O$, and steam back to step (ii).

Aspect 91. The process of aspect 88, further comprising recovering acetone from the black liquor, the light liquor, or both.

Aspect 92. The process of any of aspects 1-91, wherein the yield of glucose is at least 80%.

Aspect 93. The process of aspect 92, wherein the yield of glucose is at least 90%.

Aspect 94. The process of aspect 92, wherein the yield of glucose is at least 95%.

Aspect 95. The process of any of aspects 1-91, wherein the yield of hemicellulose sugars is at least 70%.

Aspect 96. The process of aspect 95, wherein the yield of hemicellulose sugars is at least 80%.

Aspect 97. The process of aspect 95, wherein the yield of hemicellulose sugars is at least 85%.

Aspect 98. The process of any of aspects 1-91, wherein the yield of lignin is at least 50%.

Aspect 99. The process of aspect 98, wherein the yield of lignin is at least 75%.

Aspect 100. The process of any of aspects 1-91, wherein the yield of acetic acid is at least 80%.

Aspect 101. The process of aspect 100, wherein the yield of acetic acid is at least 90%.

Aspect 102. The process of any of aspects 1-91, wherein concurrently: the yield of glucose is at least 90%; the yield of hemicellulose sugars is at least 80%; the yield of lignin is at least 50%; and the yield of acetic acid is at least 80%.

Aspect 103. The process of any of aspects 1-91, wherein concurrently: the yield of glucose is at least 95%; the yield of hemicellulose sugars is at least 90%; the yield of lignin is at least 75%; and the yield of acetic acid is at least 90%.

Aspect 104. A solvent combination for fractionating lignocellulosic biomass, the solvent combination comprising:
A first solvent selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, and cadmium monoxide/ethylenediamine (cadoxen); and
A second solvent selected from the group consisting of methanol, ethanol, 1-propanol, 2-propanol, acetone, propanal, 1-butanol, 2-butanol, butanal, butanone (methyl ethyl ketone), t-butanol, and water.

Aspect 105. The solvent combination of aspect 104, wherein the first solvent comprises polyphosphoric acid.

Aspect 106. The solvent combination of aspect 104, wherein the second solvent comprises acetone.

Aspect 107. The solvent combination of aspect 104, wherein the first solvent comprises polyphosphoric acid and the second solvent comprises acetone.

Aspect 108. The solvent combination of any of aspects 104-107, wherein the first solvent comprises at least two chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, and cadmium monoxide/ethylenediamine (cadoxen).

Aspect 109. The solvent combination of aspect 108, wherein one of the chemicals selected for the first solvent is sulfur dioxide.

Aspect 110. The process of aspect 30 or 41, wherein the first solvent comprises polyphosphoric acid and sulfur dioxide.

Aspect 111. Amorphous cellulose produced according to the process of any of aspects 1-103, wherein the amorphous cellulose can be hydrolyzed into glucose or fermented directly.

Aspect 112. A system for fractionating lignocellulosic biomass, the system comprising:
(a) A means for separately containing a first solvent and a second solvent;
(b) A reaction vessel wherein the first solvent is combined with the lignocellulosic biomass, and wherein the first solvent dissolves at least 90% of the cellulose present in the lignocellulosic biomass;
(c) A precipitation vessel wherein the second solvent is combined with the material from vessel (b), and wherein at least 90% of the cellulose that is dissolved by the first solvent in vessel (b) precipitates out of the liquid phase; and
(d) A means for recovering the precipitated amorphous cellulose.

Aspect 113. The system of aspect 112, wherein the first solvent in vessel (b) comprises one or more chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, cadmium monoxide/ethylenediamine (cadoxen), and water.

Aspect 114. The system of aspect 112, wherein the second solvent in vessel (c) comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water.

Aspect 115. The system of any of aspects 112-114, further comprising (e) a means for recovering the first solvent, the second solvent, or both.

Aspect 116. The system of aspect 115, wherein the first solvent comprises polyphosphoric acid and the second solvent comprises acetone.

Aspect 117. The system of aspect 112 or 115, further comprising (f) a means for recovering hemicellulose sugars, acetic acid, or lignin.

The present invention will now be further described in the following example which is illustrative of one preferred embodiment of the invention and should not be considered as limiting the invention in any way.

EXAMPLE

Figure 2:
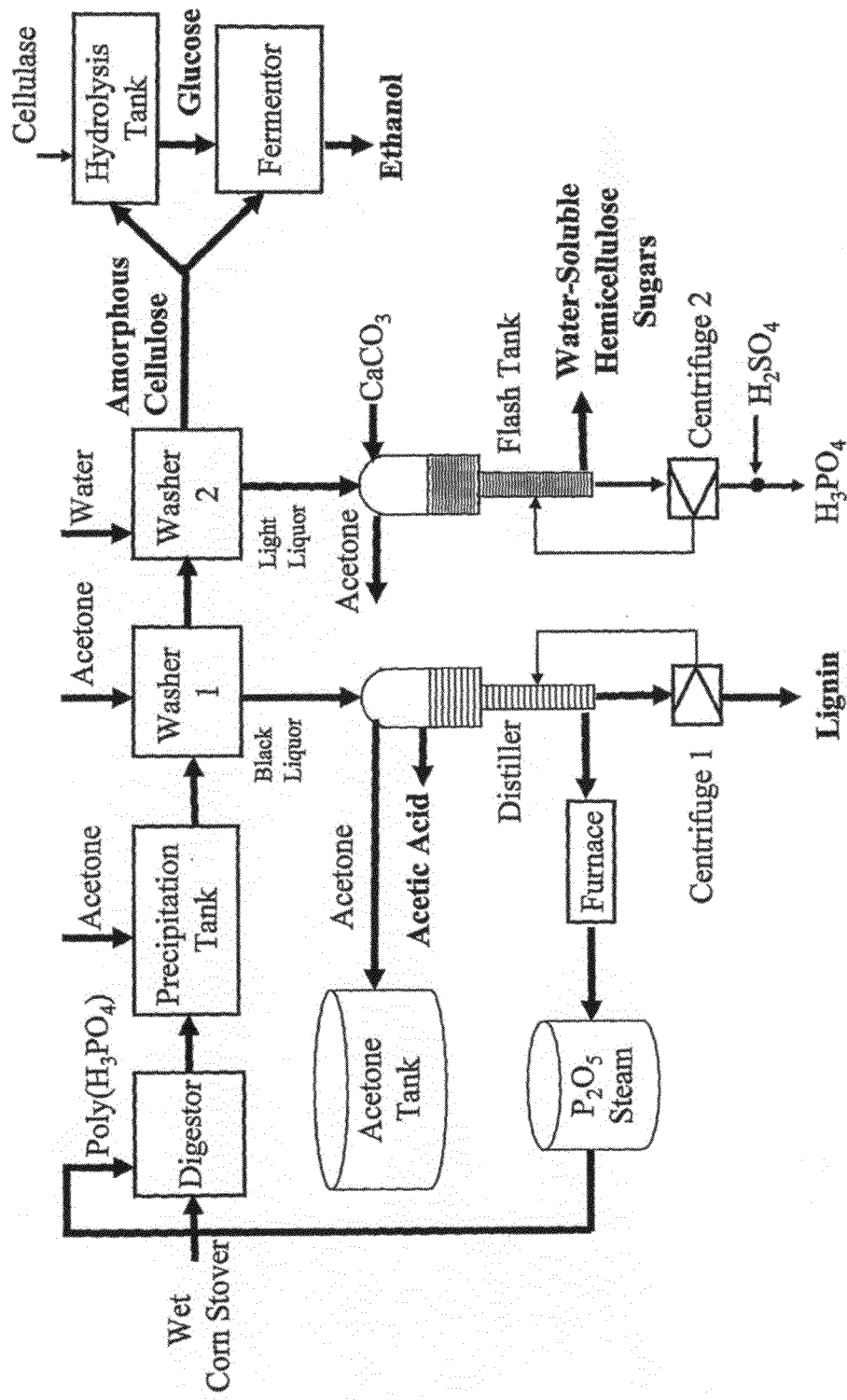
FIG. 2 depicts a process-flow diagram representing one illustrative embodiment of the fractionation process and system for corn stover, according to the present invention.

FIG. 2 shows a simplified process-flow diagram for the present example of continuous fractionation of corn stover into amorphous cellulose, hemicellulose sugars, lignin, and acetic acid, according to the methods of the invention. The first solvent is polyphosphoric acid ("Poly($H_3PO_4$)" in the diagram), the second and third solvents are acetone, and the fourth solvent is water.

Corn stover (at about 50 wt % moisture) is fed into a pretreatment reactor (the "digestor") along with recycled polyphosphoric acid, which is present in the digester at about 86 wt % $H_3PO_4$ (equivalent). The ratio of solvent to solids in the digester is about 5. The mixture is allowed to react at about 50° C. for approximately 30 minutes (residence time) under atmospheric pressure. No heat input is needed during this step because mixing of concentrated acid with water is a weakly exothermic reaction. The polyphosphoric acid not only breaks linkages among lignin, hemicellulose, and cellulose, but also dissolves elementary cellulose fibrils and hemicellulose. A small amount of hydrolysis of large polysaccharides into small fragments occurs.

In the "precipitation tank," acetone is added to precipitate dissolved cellulose and hemicellulose into insoluble amorphous forms, and to extract solvent-soluble lignin. The solvent/solids ratio in the precipitation tank is about 10. The temperature and pressure in the precipitation tank are approximately ambient, and the residence time is about one hour.

In the unit operation "washer 1" (a tank) in FIG. 2, more acetone is fed in order to remove more than 99% of the polyphosphoric acid present as well as the solvent-soluble lignin from the solids. The liquid phase exiting washer 1 is called "black liquor" and contains polyphosphoric acid, acetone, acetic acid, and dissolved lignin. The temperature and pressure in washer 1 are approximately ambient, and the residence time is about 30 minutes.

In "washer 2" (a tank), water is fed in order to wash residual acetone, residual polyphosphoric acid, and water-soluble (low-molecular-weight) hemicellulose oligosaccharides from the solid amorphous cellulose. The liquid stream exiting washer 2 is called "light liquor" and contains water, acetone, soluble hemicellulose sugars, and a trace amount of polyphosphoric acid. The solid phase contains primarily regenerated amorphous cellulose. The temperature and pressure in washer 2 are approximately ambient, and the residence time is about 30 minutes.

The solvent-recovery system in this example includes the "distiller" (a distillation column), the "flash tank," the "furnace," "centrifuge 1," and "centrifuge 2."

In the distiller, the black liquor containing polyphosphoric acid, acetone, solvent-soluble lignin, and acetic acid is separated along with regeneration of polyphosphoric acid and lignin centrifugation. Acetone and acetic acid are separated easily after distillation and then condensation. With the removal of acetone, the dissolved lignin is precipitated because it has poor solubility in acidic water. The precipitated lignin is separated by centrifugation and drying. In the bottom of the distiller, concentrated polyphosphoric acid containing small amounts of sugars and extractives from the corn stover is regenerated by feeding the bottoms to a furnace. The bottoms are completely burned to produce a mixture containing $P_2O_5$, which is recycled to the digester where it forms concentrated polyphosphoric acid. The overall process recovery of polyphosphoric acid is high, such that little or no fresh polyphosphoric acid needs to be added to the digester. (For continuous operation over long periods of time, small make-up polyphosphoric acid may become necessary).

In the flash tank, the light liquor containing acetone, water, some polyphosphoric acid, and soluble hemicellulose sugars is separated by flashing and centrifugation followed by regeneration. A small amount of $CaCO_3$ is added to neutralize the weakly acidic liquid and generate a precipitate, $Ca_3(PO_4)_2$. Just enough $CaCO_3$ is added so that at about 99% of the $PO_4^{3-}$ is present in the solid phase. $Ca_3(PO_4)_2$ is separated by centrifugation (centrifuge 2), and then is regenerated to concentrated polyphosphoric acid by adding concentrated sulfuric acid, as is well-known in the phosphoric acid industry. Acetone is recycled to a holding tank by flashing and then condensing the vapors. The liquid phase from the bottom of the flash tank is pH-neutral and contains water-soluble hemicellulose sugars.

Scanning electron microscopy shows that essentially no fibrillar cellulose remains in the amorphous-cellulose product. The amorphous cellulose is further fed to the "hydrolysis tank" along with cellulose enzymes. The product from the hydrolysis tank is a solution of glucose, which is fed to the "fermentor" wherein ethanol is produced. FIG. 2 indicates that some of the amorphous cellulose can generally be diverted directly into the fermenter, but in this example all of the amorphous cellulose is sent to the hydrolysis tank. The reactivity of the amorphous cellulose is such that nearly 97% cellulose digestibility is obtained in a standard digestibility assay (24-hour saccharification time using a *Trichoderma* enzyme loading of 15 FPU/g glucan at 50° C. and 10 g glucan per liter solution).

REFERENCES

Fengel D. and Wegener G.: *Wood: Chemistry, Ultrastructure, Reactions*. Berlin: Walter de Gruyter & Co.; 1984.

Klein G. L. and Snodgrass W. R.: "Cellulose." In *Encyclopedia of Food Science, Food Technology and Nutrition*. Edited by Macrae R, Robinson R. K., Saddler M. J.: Academic Press; 1993.

Wyman C. E.: "Ethanol from lignocellulosic biomass: Technology, economics, and opportunities." *Biores. Technol.* 1994, 50:3-15.

McMillan, J. D., "Pretreatment of Lignocellulosic Biomass." In *Enzymatic Conversion of Biomass for Fuels Production*, ACS Symposium Series 566, eds. Himmel, M. E.; Baker, J. O.; Overend, R. P. American Chemical Society, Washington, D.C. 292-324; 1994.

Klemm, D.; Philipp, B.; Heinze, T.; Heinze, U.; Wagenknecht, W. *Comprehensive Cellulose Chemistry I: Fundamentals and Analytical Methods*; Wiley-VCH: Weinheim, Germany; 1998.

Wooley R, Ruth M., Glassner D., and Sheehan J.: "Process design and costing of bioethanol technology: A tool for determining the status and direction of research and development." *Biotechnol. Prog.* 1999, 15:794-803.

V. S. Chang and M. T. Holtzapple: "Fundamental factors affecting biomass enzymatic reactivity." *Applied Biochemistry and Biotechnology* 2000, 84: 5-37.

M. Paster et al., *Industrial Bioproducts: Today and Tomorrow*; Prepared by Energetics, Incorporated, Columbia, Md. for the U.S. Department of Energy, Office of Energy Efficiency and Renewable Energy, Office of the Biomass Program, Washington, D.C.; July 2003.

Zhang Y.-H. P. and Lynd L. R.: "Toward an aggregated understanding of enzymatic hydrolysis of cellulose: Noncomplexed cellulase systems" *Biotechnol. Bioeng.* 2004, 88:797-824.

Wyman C. E., Dale B. E., Elander R. T., Holtzapple M., Ladisch M. R., and Lee Y. Y.: "Coordinated development of leading biomass pretreatment technologies." *Biores. Technol.* 2005, 96:1959-1966.

Zhang Y.-H. P., Lynd L. R.: "Determination of the number-average degree of polymerization of cellodextrins and cellulose with application to enzymatic hydrolysis." *Biomacromolecules* 2005, 6:1510-1515.

The invention claimed is:

1. A process for fractionating lignocellulosic biomass, the process comprising:
   (i) providing lignocellulosic biomass with an amount of hemicellulose present in the biomass in its native form;
   (ii) providing a first solvent and combining with the lignocellulosic biomass, wherein the first solvent dissolves at least some of the cellulose present in the lignocellulosic biomass;
   (iii) providing a second solvent and combining with the material from step (ii), wherein at least some of the cellulose that is dissolved by the first solvent in step (ii) precipitates out of the liquid phase;
   (iv) providing a third solvent and combining with the material from step (iii), and then separating a black liquor and substantially solid phase; and
   (v) providing a fourth solvent and combining with the substantially solid phase from step (iv), and then separating the solid phase comprising cellulose, and a light liquor comprising hemicellulose, and no xylose or xylose as a minor constituent.

2. The process of claim 1, wherein the first solvent in step (ii) comprises one or more chemicals selected from the group consisting of hydrochloric acid, sulfuric acid, nitric acid, phosphoric acid, polyphosphoric acid, acetic acid, sulfur dioxide, zinc chloride, sodium hydroxide, potassium hydroxide, ammonia, lithium chloride/N,N-dimethylacetamide, 1-butyl-3-methylimidazolium hexafluorophosphate, dimethylsulfoxide/tetrabutylammonium fluoride trihydrate, N-methylmorpholine-N-oxide, cadmium monoxide/ethylenediamine, and water.

3. The process of claim 1, wherein the second solvent in step (iii) comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water.

4. The process of claim 1, wherein the third solvent in step (iv) comprises one or more chemicals selected from the group consisting of methanol, ethanol, 1-propanol, 2-propanol, acetone, propanal, 1-butanol, 2-butanol, butanal, butanone (methyl ethyl ketone), t-butanol, and water.

5. The process of claim 1, wherein the fourth solvent from step (v) comprises one or more materials selected from the group consisting of liquid water, steam, recycle water, process condensate, fermentation-broth condensate, and carbon dioxide.

6. The process of claim 1, further comprising subjecting the black liquor, obtained in step (iv), to step (vi), a vapor/liquid separation operation selected from the group consisting of distillation, single-stage evaporation, multiple-effect evaporation, thermocompression, and venturi scrubbing.

7. The process of claim 1, wherein steps (ii)-(v) are each conducted in batches.

8. The process of claim 3, wherein the second solvent in step (iii) comprises acetone.

9. A process for fractionating lignocellulosic biomass, the process comprising:
   (i) providing chemically unmodified lignocellulosic biomass;
   (ii) providing polyphosphoric acid and combining with the lignocellulosic biomass, wherein the polyphosphoric acid dissolves at least 90% of the cellulose present in the lignocellulosic biomass;
   (iii) providing acetone or ethanol and combining with the material from step (ii), wherein at least 90% of the cellulose that is dissolved by the polyphosphoric acid in step (ii) precipitates out of the liquid phase;
   (iv) providing acetone or ethanol and combining with the material from step (iii), and then separating a substantially solid phase and black liquor; and
   (v) providing water and combining with the substantially solid phase from step (iv), and then separating a solid phase, which comprises the cellulose, and light liquor comprising hemicellulose with a high degree of polymerization as a major constituent.

10. The process of claim 9, further comprising separating the black liquor and recovering polyphosphoric acid.

11. The process of claim 10, wherein recovering polyphosphoric acid comprises burning a process stream and recycling $P_2O_5$ and steam back to step (ii).

12. The process of claim 9, further comprising recovering acetone from the black liquor, the light liquor, or both.

13. A process for fractionating lignocellulosic biomass comprising:
   (i) providing lignocellulosic biomass without prior removal of hemicellulose;
   (ii) removing lignin by dissolving cellulose and hemicellulose, then dissolving lignin into a liquid phase and precipitating cellulose and hemicellulose into a solid phase, and separating;
   (iii) removing hemicellulose from the solid phase by dissolving hemicellulose into a liquid phase, and separating, wherein hemicellulose is separated from the biomass solely by dissolving, precipitating, and re-dissolving hemicellulose at reactor temperatures ranging between about 20° C. and 80° C., whereby less furfural is produced than compared with a method for removing hemicellulose from the biomass in which hemicellulose is hydrolyzed at reactor temperatures above 80° C.

* * * * *